April 21, 1959  E. A. SCHONROCK  2,883,237
LONG WHEEL BASE TANDEM UNIT FOR DUMP
TRUCKS AND TRAILERS
Filed Dec. 20, 1954  8 Sheets-Sheet 3

Fig. 4

Edwin A. Schonrock
INVENTOR.

April 21, 1959

E. A. SCHONROCK 2,883,237

LONG WHEEL BASE TANDEM UNIT FOR DUMP TRUCKS AND TRAILERS

Filed Dec. 20, 1954

Edwin A. Schonrock
INVENTOR.

BY

United States Patent Office 2,883,237
Patented Apr. 21, 1959

2,883,237

LONG WHEEL BASE TANDEM UNIT FOR DUMP TRUCKS AND TRAILERS

Edwin A. Schonrock, San Angelo, Tex.

Application December 20, 1954, Serial No. 476,125

20 Claims. (Cl. 298—17)

This invention comprises novel and useful improvements in a long wheel base tandem unit for dump trucks and trailers and comprises improvements over and an adaptation of the same principle of my prior Patent No. 2,661,236.

The principal purpose of this invention is to provide a means whereby dump trucks and dump trailers may be mounted upon and provided with a long wheel base tandem assembly for improved weight distribution between the axles of the trailer and tractor consistent with present State highway regulations.

A further important object of the invention is to provide means in conformity with the preceding object which, although not limited to use in cable dump trailers, is especially adapted for incorporation in that type of dump trailer.

A further important object of the invention is to provide means whereby a long wheel base tandem axle assembly may be applied to a dump truck or dump trailer chassis in order that the body of the truck or the trailer may be elevated or inclined to a dumping position and still retain all four wheels of its tandem axle assembly upon the ground in load-supporting position throughout the entire dumping operation.

A further object of this invention is to provide an improved tandem axle assembly for a dump trailer which will enable the tandem axles to be disposed in either conventional or in a longitudinally extended wheel base for the trailer.

Yet another object of the invention is to provide a device in conformity with the preceding object which may be readily applied as an attachment to conventional dump trailers or truck bodies for the purpose of effecting a longer wheel base for the tandem axle assembly therefor with a resultant better load distribution upon the road bed.

A still further object of the invention is to provide an apparatus as set forth in the preceding objects and which shall constitute a tandem axle assembly attachment equally adaptable for use with dump trailers or dump trucks to provide a tandem rear axle assembly for the same.

A still further and fundamental purpose of this invention is to provide an apparatus whereby the principles and advantages of a rear axle tandem assembly as set forth in my prior Patent No. 2,661,236 may be advantageously applied and realized with a resulting increase in the wheel base of the tandem axle assembly.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

In my prior Patent No. 2,661,236, there is disclosed and claimed a construction whereby the rear portion of a dump trailer is pivotally mounted upon a tandem rear axle assembly in such manner that when the body of the dump trailer is elevated or tilted to its dumping position, the weight of the same is carried by and supported equally by the tandem axles and their four supporting wheels. This construction has the important advantage that the weight of the body and its load which is distributed between the two tandem axles is always uniformly divided between them throughout the entire dumping operation, preventing any excessive load being placed upon one axle.

In some instances, however, owing particularly to local State highway regulations, it is desirable to increase the spacing between the tandem axles and thus distribute the load of the trailer or truck body over a longer tandem axle wheel base. The present invention provides methods and arrangements whereby the foregoing is accomplished; and whereby conventional dump trailers and dump trucks may be converted to realize the above mentioned advantages and principles by applying an attachment or adapter subassembly thereto.

Although in my above identified prior patent the tandem axle assembly has been shown applied to a dump trailer of the cable dump trailer type, it is to be clearly understood that the principles and advantages of this invention are in nowise limited thereto, but may be utilized with dump trailers having any desired means for effecting the dumping operation; and may likewise be applied to the bodies of dump trucks for the purpose of lengthening or increasing the wheel base of the tandem axle assembly thereof. In the following description, it should be understood that both types of usages of this invention are intended.

Figure 1:
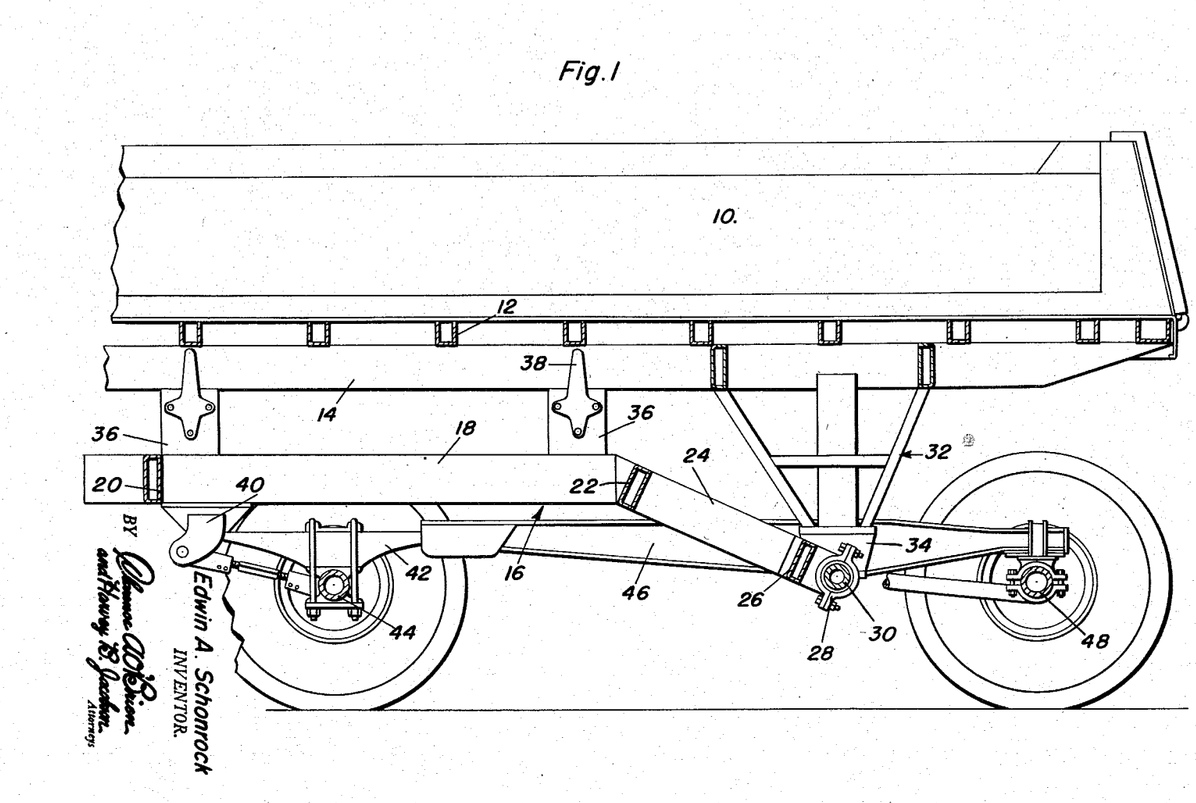
Figure 1 is a side elevational view of a first embodiment in accordance with this invention, parts being broken away and parts omitted, of a portion of the rear end of a dump trailer or dump truck to which has been applied the long wheel base tandem unit of this invention, the body being shown in its lowered, load carrying position.
Figure 2:
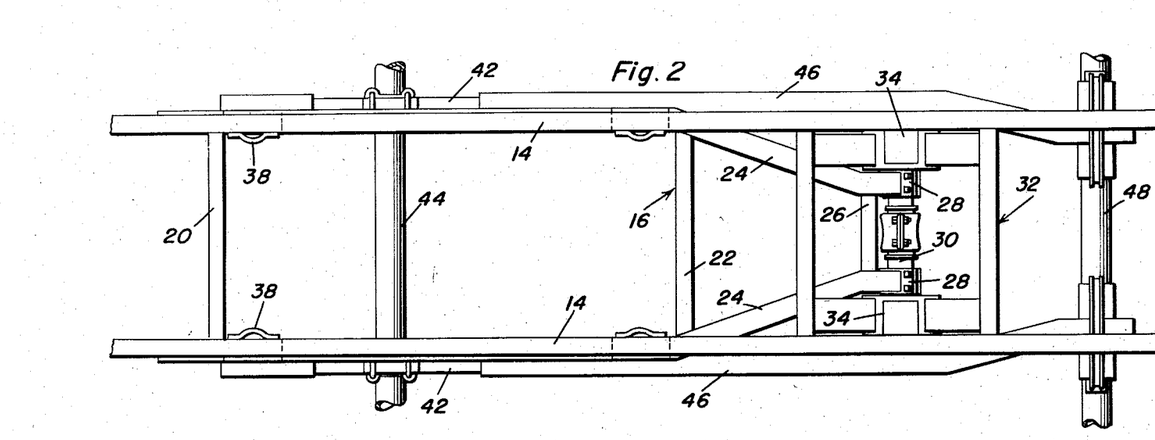
Figure 2 is a horizontal plan view of the apparatus of Figure 1, taken directly below the body of the dump truck or trailer, parts being broken away.
Figure 3:
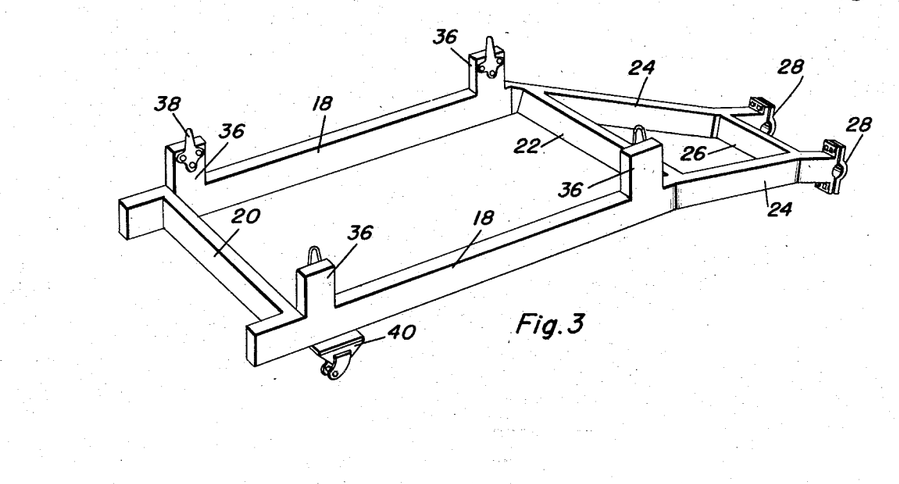
Figure 3 is a perspective view of the sub-frame assembly of the attachment of Figure 1.

Reference is made first to the embodiment disclosed in Figures 1–3, and in which there is disclosed the body 10 of a dump trailer or dump truck, the same including transversely extending cross-members 12 by means of which the body is supported upon the main truck or trailer frame 14. Operatively connected to this frame is the long wheel base tandem unit or adapter indicated generally by the numeral 16 and which is illustrated as being of a known conventional type.

The adapter unit forming the subject of this invention consists of a main frame, shown more clearly in Figure 3, and comprising a pair of longitudinal frame members 18 which are rigidly connected together by suitable transverse frame members 20 and 22. Extending forwardly from one end of the frame members 18 are a pair of downwardly inclined and convergent portions 24 which, adjacent their forward extremities, are connected by a rigid transverse cross-member 26. As will be apparent from Figure 1, the members 20, 22, and 26 may conveniently be of a hollow box girder construction, and the members 18 and 24 may likewise be of this construction. At their extremities, the members 24 are provided with split clamps or journals 28 of any suitable design for engaging a transverse axle or trunnion 30 therebetween. Depending from the main frame 14 and rigidly connected thereto is a support assembly indicated generally by the numeral 32 and which may be of any desired construction, this assembly having journal bearings, indicated generally by the numerals 34, and which may be of the split clamp type, and which are journaled upon the trunnion or axle 30. By this means, the rear end of the body 10 is pivotally supported upon the axle 30 for vertical pivoting movement about a horizontal axis between a lowered load carrying position shown in Figure 1 and a steeply inclined, raised or dumping position.

Depending from the subassembly frame members 18 adjacent the other end of the same are a pair of spring hangers 40 by means of which the forward ends of a pair of springs 42 are attached to the subassembly, this pair of springs 42 having a transverse axle 44 mounted thereon as illustrated. A walking beam 46 has its front end secured to the spring assemblies 42 and at its other end is secured to an axle 48. Since the manner of this attachment may be conventional and is immaterial to the invention claimed herein, further illustration or description is deemed unnecessary. The axles 44 and 48 are thus disposed in tandem arrangement and constitute the elongated wheel base of the tandem axle assembly. It will now be apparent that the use of the walking beam permits the tandem axle assembly to have any desired elongated wheel base, enabling a relatively greater spacing of the load upon the roadway.

It is intended that the frame members 18, 24 shall be of sufficient length to give the desired relatively longer than conventional wheel base in order to distribute the load of the tandem axles over a greater distance. In some instances, the spring 42 may be omitted, the axle 48 being clamped to the end of the walking beam 46.

Any desired means may be provided for effecting the tilting movement of the body 10 about the trunnion 30, as, for example, the means set forth in my above-mentioned prior patent. However, in place of the cable actuating mechanism disclosed therein, the invention also contemplates the use of any other desired body elevating mechanism, as, for example, hydraulic actuators and the like.

In operation, in load carrying position, the body frame member 14 rests upon the upstanding supports 36 and is retained thereon against lateral shifting movement by the upwardly projecting retaining brackets 38. It will be noted that in this position, owing to the walking beam construction and the relatively great displacement of the tandem axles from each other, the load is distributed over a considerably greater wheel base than in conventional tandem axle assemblies.

When the body is elevated to dumping position by any desired mechanism, the body including its support assembly 32 pivots in a vertical plane about the horizontal axis of the supporting axle 30 carried by the subassembly 16. It will be observed that during this dumping operation the entire weight of the body is distributed between the tandem axles, all four wheels of which remain upon the road bed and support the load therebetween, and that when the body is lowered to normal position, the same is guided to and retained in such position by the brackets 38.

The present invention, therefore, provides a method and an apparatus whereby the advantages of a tandem axle assembly for use in dump trailers and truck bodies, as set forth in my prior patent, may be effected by the provision of an adapter unit or attachment which may be applied to conventional truck and trailer chassis; and whereby the load carried by the tandem axle assembly is distributed over a greater wheel base than normal.

Attention is next directed more specifically to Figures 4–7 which disclose a second embodiment and method for carrying out the principles of this invention. In this arrangement, the dump trailer or truck body is identical with that previously described, and accordingly the same numerals have been applied to like parts therein. However, a modified construction of attachment or adapter unit, indicated generally by the numerals 60, which may form a part of, or may be connected in a conventional manner to a tractor vehicle, is utilized.

In this form, however, the subassembly frame consists of a pair of longitudinal frame members 62, which are provided with upstanding guide and retainer brackets 64 for the same purpose as the brackets 38 previously mentioned. The frame members 62 at one end, however, are provided with triangular supporting brackets or supports 66, see Figure 5, which depend therefrom and which at their lower ends are provided with split clamps 68 by means of which a transverse trunnion or axle 70, similar to and serving the same purpose as the axle 30 of the preceding embodiment, is fixedly secured to the supports 66. Likewise fixedly secured to the frame members 14 of the body and depending therefrom are a pair of triangular supporting brackets or supports 72 which, at their lower extremities, are provided with split clamps 74 constituting journal bearings by means of which the body and the support 72 are pivotally mounted upon the transverse axle 70.

Figure 4:
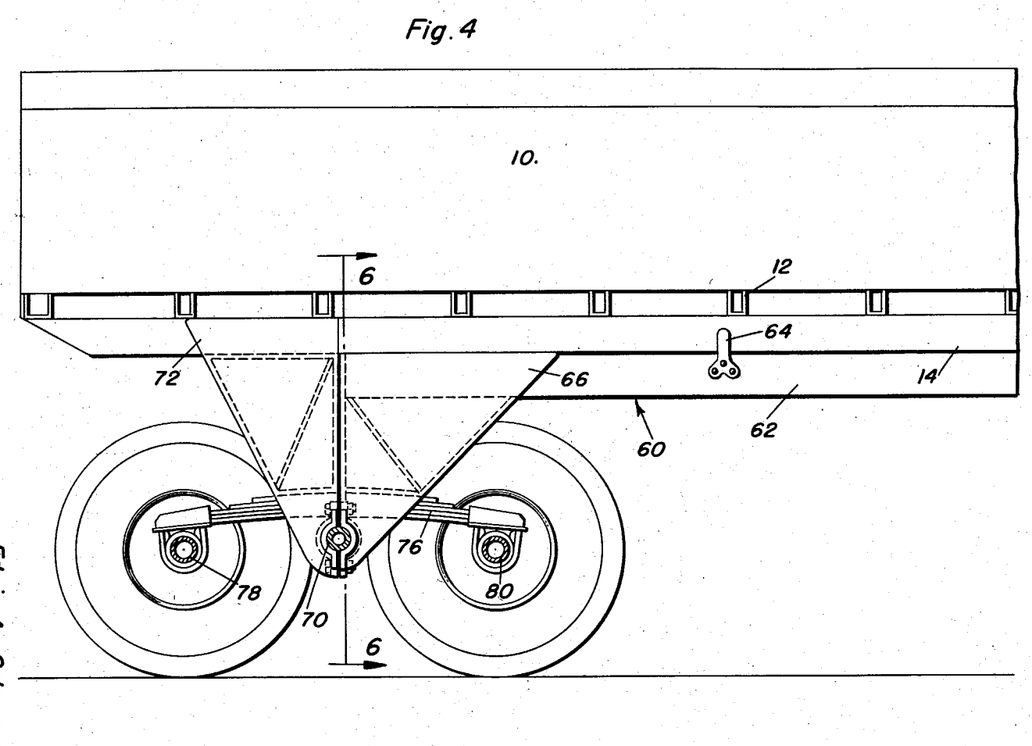
Figure 4 is a fragmentary side elevational view of a portion of the rear end of a dump trailer or truck and showing a second embodiment of this invention applied thereto, certain concealed parts being shown in dotted lines, the body being shown in its lowered or lead-carrying position.
Figures 5, 6, 7:
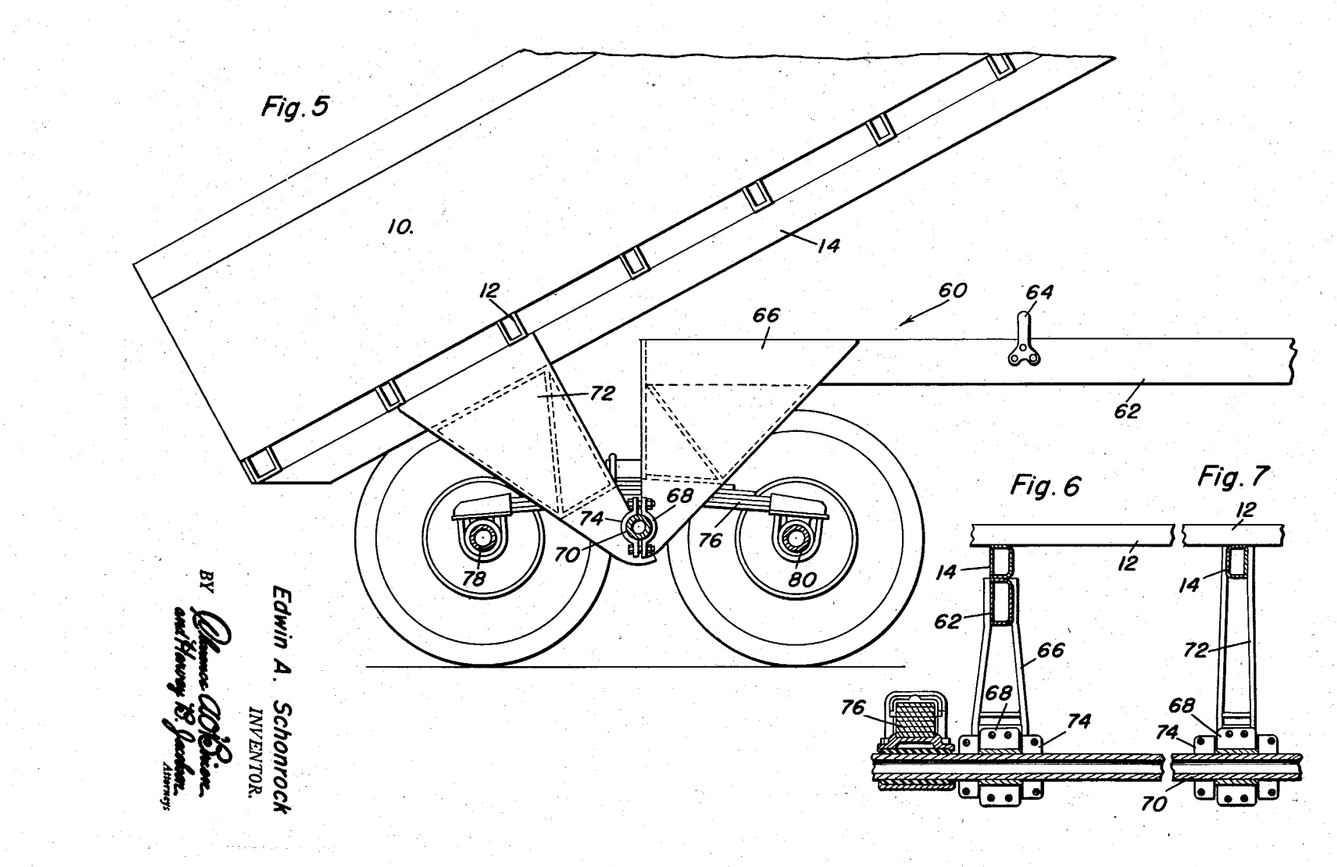
Figure 5 is a view similar to Figure 4 and of the second embodiment but showing the dump trailer or truck elevated into dumping position.
Figure 6 is a vertical transverse sectional view taken substantially upon the plane indicated by the section line 6—6 of Figure 4.
Figure 7 is a view similar to Figure 6 and taken substantially upon the plane of section line 6—6 but looking in the opposite direction from Figure 6.

The axle 70, in turn, is suitably mounted upon and secured to the mid portions of a pair of supporting springs 76 which, at their outer extremities, are provided with a pair of tandem axles 78 and 80. It will thus be seen that the axles 78 and 80 constitute a tandem rear axle assembly for the dump trailer or truck and that the body of the dump trailer or truck is pivotally carried thereby in such manner that the weight is distributed uniformly between the tandem axles at all times, and regardless of the vertical inclination of the body 10.

At their other ends, the members 62 may be connected to a tractor vehicle in any conventional manner to form the trailer chassis to which the body 10 is pivoted. Alternatively, the member 62 may be rigidly attached to the frame of a truck or form a part of its chassis, the member 10 constituting the dump body of the truck.

The operation of this form of the invention is identical to that previously disclosed, and further description is deemed to be unnecessary.

It will be noted, however, that in the attachment as disclosed in the embodiment of Figures 4–7 the advantages of a conventional tandem axle assembly may be applied to a conventional truck or dump trailer. It is also possible to substitute in this embodiment the elongated wheel base and walking beam constructions of the arrangement of Figures 1–3 in order to elongate the wheel base of the tandem axle assembly. Any suitable means may be provided for effecting the tilting and dumping movement of the body.

Figure 8:
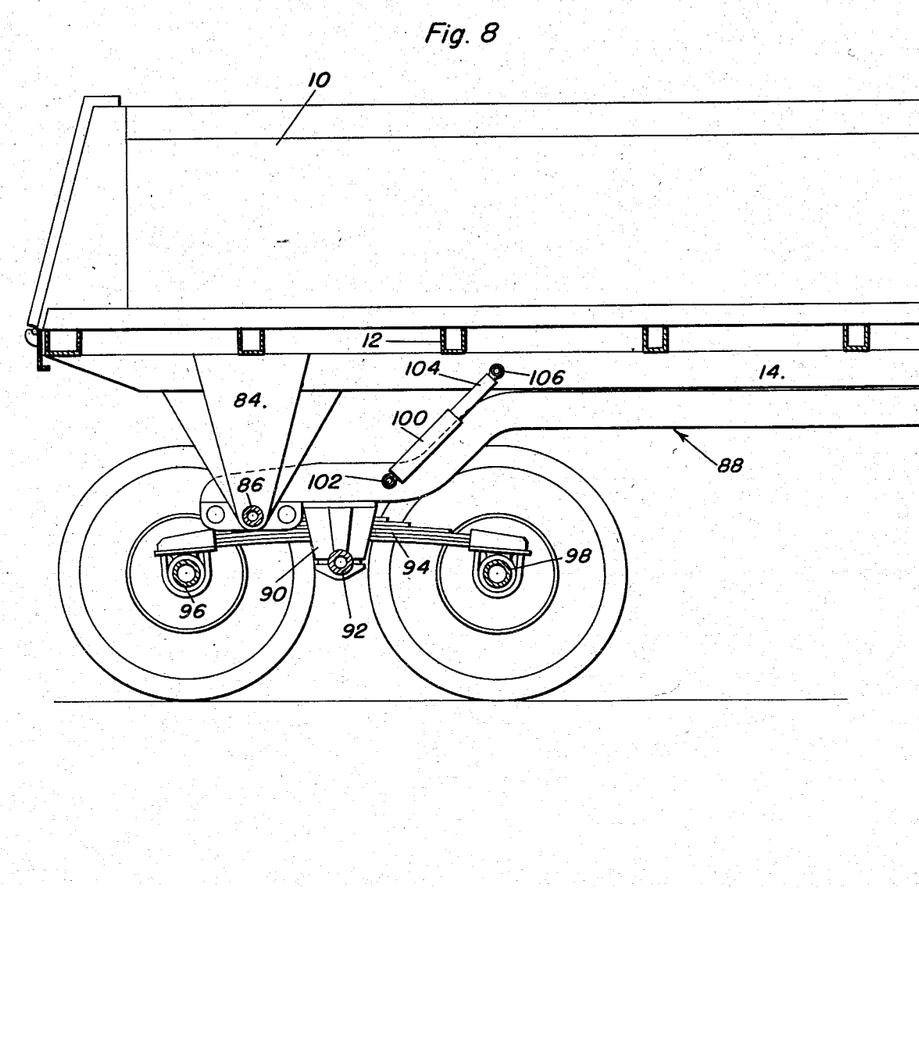
Figure 8 is a vertical central longitudinal sectional view through the rear portion of a dump trailer or dump truck and showing the manner in which a third embodiment in accordance with this invention is applied thereto.

Attention is now directed to Figure 8 which shows a third embodiment of the adapter unit. As in the preceding embodiments, the truck or trailer body 10 is provided with the cross-members 12 by means of which the same is supported upon the pair of main frame members 14. The latter are provided with depending supports 84 which at their lower ends are journaled upon a transverse axle or trunnion 86. The latter is carried by one end of the sub-frame assembly of the attachment 88 which cooperates with the truck or trailer body main frame 14 in the manner previously set forth in connection with Figures 1–7. Depending from the adapter frame are supports 90 which are mounted upon the transverse trunnion or axle 92. The latter in turn is carried by spring assemblies 94 which, at their opposite ends, have transverse tandem axles 96 and 98 clamped thereto. It will thus be apparent that the trailer or truck dump body is carried by the tandem axle assembly and is pivotally mounted upon the sub-assembly frame by the transverse axle 86. In order to effect tilting movement between the dump body and the tandem axle adapter unit 88, there may be provided hydraulic actuating cylinders 100 which are pivoted to the subassembly frame as by transverse axles or pivot pins 102, and which have their piston rods 104 pivoted to the main frame 14 as by transverse axles or pivots 106.

It will also be understood that the walking beam constructions of Figures 1–3 may likewise be employed here in order to secure an elongation of the wheel base of the tandem axle assembly and that the unit 60 may be connected to or form a part of a truck frame.

The operation of this form of the invention is similar to that previously described and further description and explanation is believed to be unnecessary.

The preferred embodiment of the invention is illustrated in Figures 9–14 in which there is disclosed the trailer body 150, pivotally mounted upon the sub-frame 152, which in turn is journaled upon the tandem axle unit 154. The latter is of the construction previously described in Figures 1–3, including the pair of walking beams 156 each having a spring assembly 158 at one end. A pair of tandem axles 160 and 162 are secured to the walking beams 156 and the spring assemblies 158, respectively, adjacent their opposite ends. The customary torque rods 164 and 166 may be secured to the axles for resisting any twisting of the same.

Figure 10:
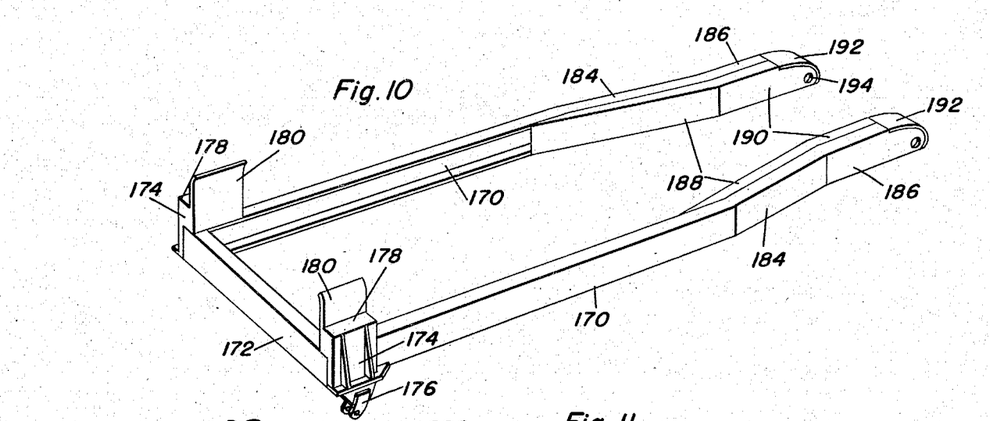
Figure 10 is a perspective view of the sub-frame of the modified construction of Figure 9.
Figure 11:
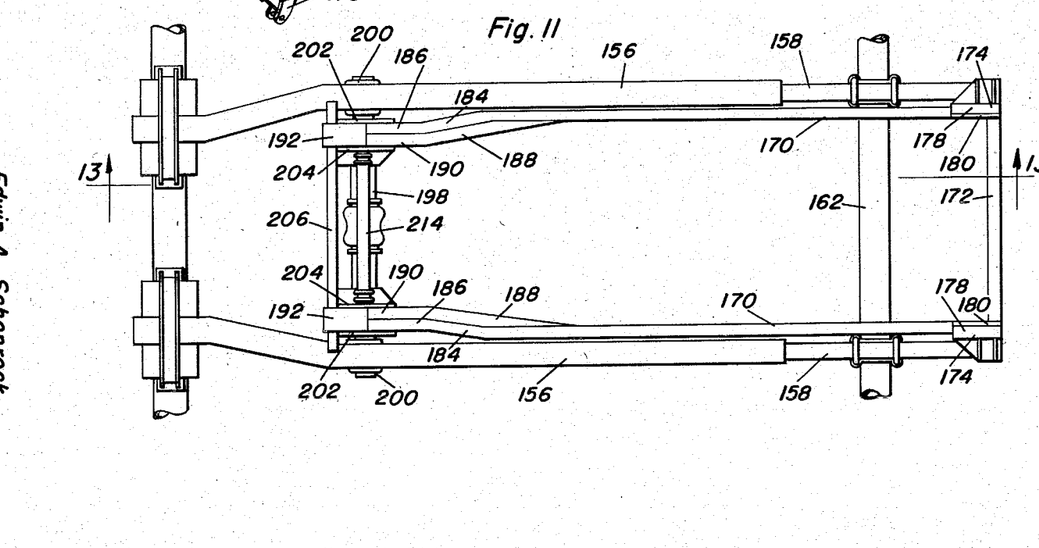
Figure 11 is a horizontal plan view of the embodiment of Figure 9, taken directly below the body of the dump truck or trailer, parts being omitted.
Figure 12:
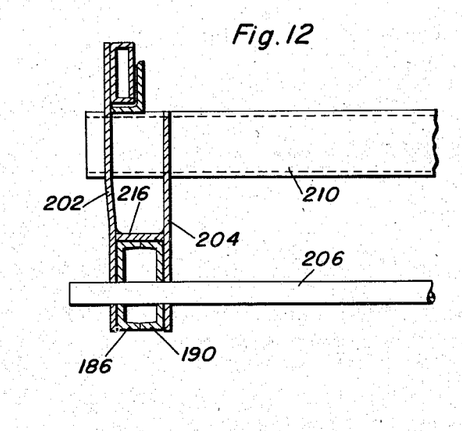
Figure 12 is a vertical transverse sectional detail view of the embodiment of Figure 9, being taken substantially upon the plane indicated by the section line 12—12 of Figure 9.

The sub-frame assembly, see Figures 10 and 11 especially, consists of a pair of longitudinal channel members 170, rigidly connected at one end by a frame cross-member 172 and having thereat a pair of laterally offset upstanding brackets 174 welded thereto. Depending from the brackets are hangers 176 to which the torque rods 166 are connected, the ends of the spring assemblies 158 being seated in the hangers 176. The brackets include upper horizontal surfaces 178 and upstanding guide flanges 180 which are adapted to guide the runners or frame members 182 of the body 150 and retain them in position when they are lowered upon the surfaces 178 in the load-carrying position of the body.

At their free ends, the channel members 170 are provided with angulated convergent portions 184 ending in parallel terminal portions 186. A pair of reinforcing channel members 188 and 190 are welded to the portions 184 and 186 respectively, thereby forming box members with the latter and strengthening the free ends of the members 170. At their free extremities, the portions 186 and 190 are contoured to curved edges and curved plates 192 are welded to these edges, thus giving a curving shape to the ends of the members 170 for a purpose to be subsequently set forth. Transverse bores 194 are provided in the vertical walls of the channel members 186 and 190.

Figure 13:
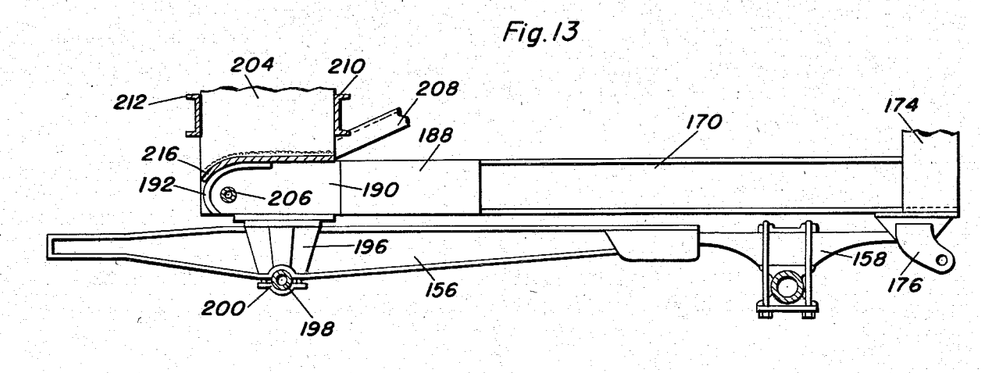
Figure 13 is a fragmentary vertical longitudinal sectional view through the long tandem assembly of Figure 9, being taken substantially upon the plane indicated by the section line 13—13 of Figure 11.
Figure 14:
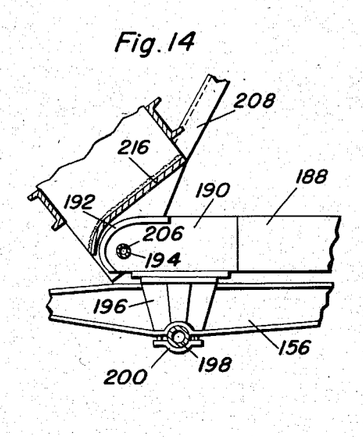
Figure 14 is a detail view of the left hand portion of Figure 13, but showing the parts in a different position assumed during the dumping operation.

Secured to the sub-frame assembly 152 and depending from the free ends of the longitudinal members 170 thereof are mounting assemblies 196 which as also shown in Figures 13 and 14 are pivotally journaled upon the transverse axle or trunnion 198, which in turn is clamped at 200 to the walking beams 156. As so far described, it will now be apparent that the left hand or rear end of the sub-frame assembly is pivoted to the trunnion of the tandem axle assembly for vertical tilting movement, this movement being permitted but limited by the flexing of the spring assemblies 158 and the twisting of the axle 162 carried thereby, thus enabling a slight raising or lowering of the right hand or forward end of the longitudinal members 170 relative to the walking beams 156, which latter have a slight downward pivoting movement about the axle 160.

A support or fulcrum assembly pivotally secures the runners 182 of the body 150 to the sub-frame assembly. This fulcrum assembly as shown best in Figure 12 may conveniently comprise a pair of vertical plates 202 and 204 welded at their upper ends to the vertical faces of each of the runners 182 and embracing the channel members 186 and 190, being pivoted upon the pin or axle 206 which is mounted in the above mentioned bores 194. Further brace members 208 are welded to the runners 182, to the cross-members 210 and to the plates 202, being also journaled upon the axle 206. The cross-members 210 and 212 are welded to the vertical edges of the plates 202 and 204 and to the runners 182 to rigidify the structure.

Figure 9:
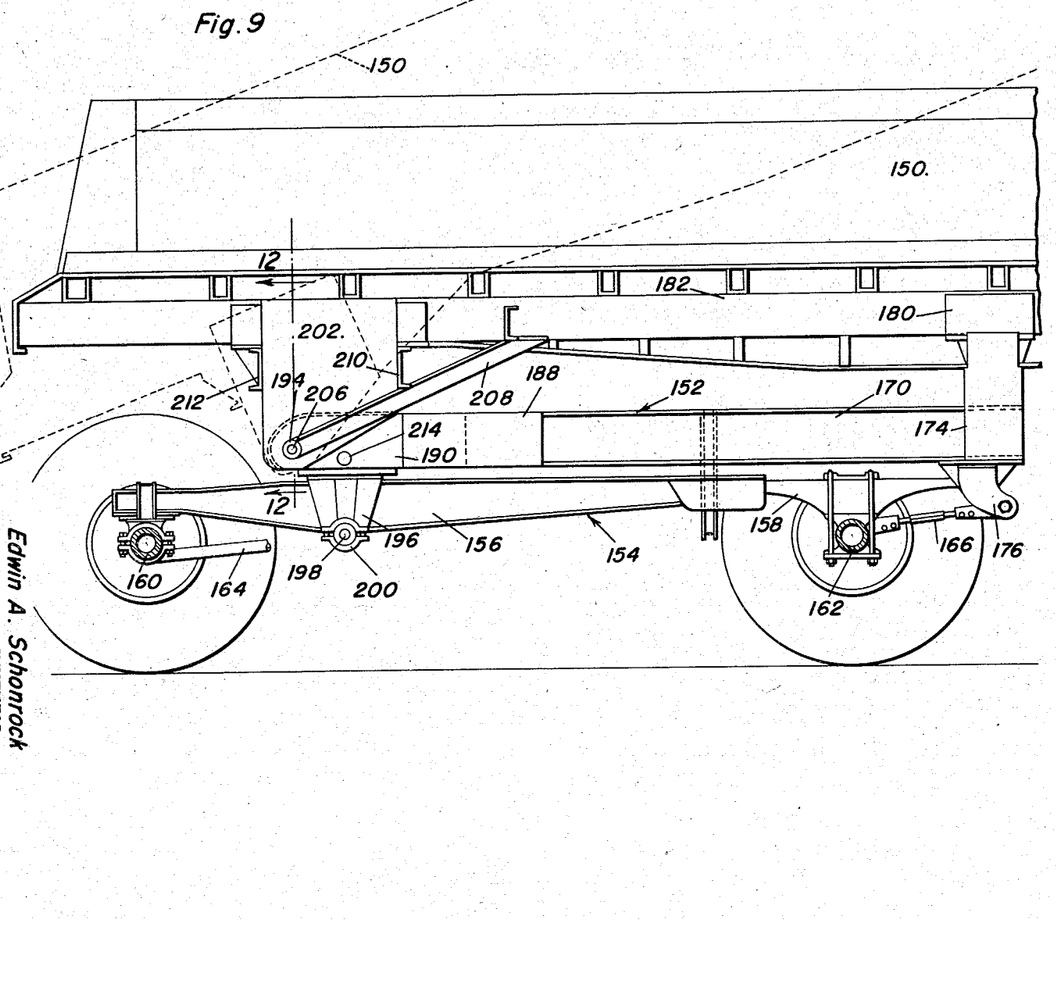
Figure 9 is a vertical elevational view, parts being shown in section, of the rear portion of a truck or dump trailer in accordance with a fourth and preferred embodiment of this invention, the dump body being shown in full lines in its lowered or load carrying position and in dotted lines in its lifted or dumping position.

Mounted between the end portions 186 and 190 is a shaft 214 which carries the pulley assembly, not shown, by which the cable rigging draws the trailer towards its tractor and tilts the trailer body vertically about the axle 206, as shown in dotted lines in Figure 9, and as described in my above identified patents and applications.

A very important feature of the construction and operation of this modification resides in a feature to be now set forth.

Between the lower ends of the plates 202 and 204 there are welded curved plates 216 which are complementary in shape and contour to those of the plates 192. In the lowered or load-carrying position of the body, the plates 216 rest upon the plates 192 and thereby directly apply the load of the body to the subframe assembly, thus relieving the axle 206 of this weight.

To assist in this last function, a slight vertical displacement of about one-sixteenth of an inch of the plates 202 and 204 relative to the axle 206 is permitted by an appropriate vertical elongation of the apertures through which the axle 206 passes. The lower edges of the plates 202 and 204 are also slightly rounded as shown to insure clearance during their vertical pivoting movement. During the beginning of the lifting and the conclusion of the lowering movement of the body, the plates 216 engage the plates 192 producing a camming action which thus slightly lifts the weight of the body 150 off the pivot pin 206 whereby the weight is directly borne by the runners 182 resting upon the surfaces 178 and 182, this being permitted by the vertically elongated apertures.

It should be especially noted that the walking beam construction of the tandem axle assemlby 154 may omit the spring assembly 158 and directly secure the axle 162 to the end of the beam 156; or, if desired, spring assemblies may be secured between each of the tandem axles and the ends of the walking beam in this as well as in any of the previously described embodiments.

The construction illustrated in Figure 9 possesses certain novel features in the tilting and dumping of the trailer, as follows. Starting with the full line position of Figure 9, it is assumed that the lifting and dumping mechanism begins to cause tilting of the body 150. Since the latter rests by means of the plates 216 upon the plates 192, there is a rocking or rolling action between these plates which has the effect of affording a greater mechanical advantage than would arise from the tilting about the axle 206. This reduces the strain upon the lifting mechanism, which of course is subjected to its greatest stress when initiating the upward tilting movement.

After the tilting has started, and continued until the plates 216 move out of contact with the plates 192, as shown in Figure 14, the weight of the body is now transferred to the axle 206.

As the body frame members 182 rise from the support brackets 174, the effective load of the body on the assembly 152 shifts from approximately the midportion of the walking beam 156 to the axle 206 which is displaced therefrom towards the rearmost axle 160. As this occurs, the spring 158 is released or freed from some of its load, thereby slightly lifting its end of the walking beam 156 and the beams 170, whereby these members will pivot slightly upwardly about the axle 160, thus causing in turn a slight upward and rearward movement of the axle 206. This movement, occurring only after the body 150 has been considerably elevated, augments and hastens the total tilting of the body.

It will thus be seen that in addition to securing a better load distribution upon the road, this invention provides a greatly improved dumping action by lessening wear on the parts, lessening strain on the lifting mechanism and hastening and augmenting the tilting action.

In the lowering operation, the same steps and advantages are secured, although generally the body is lowered empty, or partially so, and therefore the mechanism is usually not subjected to the maximum forces attending the lifting movement.

The action of the long wheel base tandem assembly as just described is also present in the embodiment of Figures 1–3.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An adapter unit for providing a tandem axle assembly for dump trucks and trailers comprising; a subassembly having a frame adapted to receive and support in normal load carrying position a dump body, a tandem axle and spring assembly including a pair of tandem axles secured to said subassembly frame, a support pivotally connected to said subassembly whereby a dump body may be pivoted to said subassembly between said tandem axles for vertical tilting movement, said subassembly including a pair of frame members having spring hangers adjacent one end and a transverse, horizontal trunnion upon which said support is pivotally mounted adjacent their other end, springs having one tandem axle mounted thereon and secured at one of their ends to said spring hangers, walking beams attached at one of their ends to the other ends of said springs and having the other tandem axle mounted adjacent their other ends whereby to provide a lengthened wheel base for said tandem axles.

2. An adapter unit for mounting a tandem axle assembly upon dump trucks and trailers comprising; a subassembly having a frame, means for securing said subassembly upon a tandem axle assembly, means adapted for attachment to a dump body for journaling the latter upon said frame for vertically tilting movement relative thereto, said journaling means and said frame including a traveling fulcrum bearing.

3. An adapter unit for mounting a tandem axle assembly upon dump trucks and trailers comprising; a subassembly having a frame, means for securing said subassembly upon a tandem axle assembly, means adapted for attachment to a dump body for journaling the latter upon said frame for vertically tilting movement relative thereto, said frame including a pair of longitudinal beams, said journaling means comprising support plates, axle means pivotally connecting said plates to said beams and providing for relative lost motion between the plates and the beams.

4. An adapter unit for mounting a tandem axle assembly upon dump trucks and trailers comprising; a subassembly having a frame, means for securing said subassembly upon a tandem axle assembly, means adapted for attachment to a dump body for journaling the latter upon said frame for vertically tilting movement relative thereto, said frame including a pair of longitudinal beams, said journaling means comprising support plates, axle means pivotally connecting said plates to said beams and providing for relative lost motion between the plates and the beams, said plates and beams having complementary cam surfaces providing said traveling fulcrum bearing.

5. An adapter unit for mounting a tandem axle assembly upon dump trucks and trailers comprising; a subassembly having a frame, means for securing said subassembly upon a tandem axle assembly, means adapted for attachment to a dump body for journaling the latter upon said frame for vertically tilting movement relative thereto, said frame including a pair of longitudinal beams, said journaling means comprising support plates, axle means pivotally connecting said plates to said beams and providing for relative lost motion between the plates and the beams, said support plates being disposed in pairs, each pair embracing one of said beams.

6. An adapter unit for mounting a tandem axle assembly upon dump trucks and trailers comprising; a subassembly having a frame, means for securing said subassembly upon a tandem axle assembly, means adapted for attachment to a dump body for journaling the latter upon said frame for vertically tilting movement relative thereto, said frame including a pair of longitudinal beams, said journaling means comprising support plates, axle means pivotally connecting said plates to said beams and providing for relative lost motion between the plates and the beams, said support plates being disposed in pairs, each pair embracing one of said beams, said plates and beams having complementary cam surfaces providing said traveling fulcrum bearing.

7. An adapter unit for mounting a tandem axle assembly upon dump trucks and trailers comprising; a subassembly having a frame, means for securing said subassembly upon a tandem axle assembly, means adapted for attachment to a dump body for journaling the latter upon said frame for vertically tilting movement relative thereto, said frame including a pair of longitudinal beams, said journaling means comprising support plates, axle means pivotally connecting said plates to said beams and providing for relative lost motion between the plates and the beams, said support plates being disposed in pairs, each pair embracing one of said beams, said plates and beams having complementary cam surfaces providing said traveling fulcrum bearing, each of said pair of plates having a web extending transversely therebetween, said web comprising one of said complementary cam surfaces, the other of said complementary cam surfaces being disposed upon a beam.

8. The combination of claim 2 wherein said traveling fulcrum bearing consists of cooperating curved surfaces on said frame and on said attachment means.

9. The combination of claim 2 wherein said traveling fulcrum is disposed at one end of said frame.

10. A tandem axle assembly for dump trucks and trailers of a type having bodies of a length greatly exceeding that of conventional types of bodies comprising; a subassembly having a frame including a pair of longitudinal members receiving and supporting thereon in normal load carrying position the rearward portion only of the longitudinal frame members of a dump body, a tandem axle assembly secured to and supporting said subassembly frame, said tandem axle assembly including a pair of tandem axles each secured to said subassembly in widely spaced relation whereby the load of said body is more widely distributed upon a roadbed by said spaced axles, a support secured to and supporting said dump body and pivotally connected to said subassembly between said tandem axles whereby said dump body is pivoted to said subassembly for vertically tilting movement.

11. A tandem axle assembly for dump trucks and trailers of a type having bodies of a length greatly exceeding that of conventional types of bodies comprising; a subassembly having a frame including a pair of longitudinal members receiving and supporting thereon in normal load carrying position the rearward portion only of the longitudinal frame members of a dump body, a tandem axle assembly secured to and supporting said subassembly frame, said tandem axle assembly including a pair of tandem axles each secured to said subassembly in widely spaced relation whereby the load of said body is more widely distributed upon a roadbed by said spaced axles, a transverse, horizontal trunnion disposed between and carried by said subassembly frame longitudinal members, a support secured to and supporting said dump body and mounted upon said trunnion between said tandem axles whereby said dump body is pivoted to said subassembly for vertically tilting movement.

12. The combination of claim 10 wherein said tandem axle assembly includes a pair of walking beams, said tandem axles being each secured to said pair of walking beams adjacent opposite ends of the latter whereby to provide a lengthened wheel base for said axles.

13. The combination of claim 10 wherein said tandem axle assembly includes a pair of walking beams, said tandem axles being each secured to said pair of walking beams adjacent opposite ends of the latter whereby to provide a lenghtened wheel base for said axles, a pair of springs each secured to and carried by one of said axles, means securing one end of each spring to an adjacent end of a walking beam, means securing the other end of each spring to the adjacent end of a subassembly frame longitudinal member, means securing the other axle to the other ends of said walking beams.

14. A long wheel base tandem rear axle assembly adapted for use as an attachment to replace the conventional rear axle assembly of a trailer having a body considerably longer than conventional and comprising; a subassembly including a frame having a supporting surface adapted to receive and support in normal load carrying position the rear portions only of a trailer body which is considerably longer than conventional, a tandem rear axle assembly, means mounting said subassembly frame upon said tandem rear axle assembly, means securing said rear portion of said trailer body to said subassembly frame, said tandem rear axle assembly including a pair of widely spaced tandem axles whereby to distribute the load of said rear portion of said trailer body widely over a roadbed.

15. The combination of claim 14 wherein said tandem rear axle assembly and said trailer body are so associated that said tandem rear axle assembly has its rear axle disposed beneath the rear portion and its forward axle disposed beneath a midportion of said trailer body and well forwardly of said securing means.

16. The combination of claim 14 wherein said tandem rear axle assembly includes a pair of walking beams, said tandem axles being each secured to both of said walking beams at opposite ends thereof, said body securing means being disposed between the axles.

17. The combination of claim 14 wherein said mounting means includes a connection between one end of said subassembly frame and said rear axle assembly between the axles thereof and a connection between said subassembly frame and said rear axle assembly outwardly beyond the axles thereof.

18. A trailer of the type having a body of a length greatly exceeding that of conventional types and having support means for its front end and a rear axle assembly supporting its rear end, said rear axle assembly comprising a subassembly frame engaging and supporting the rear portion only of said trailer body and widely spaced front and rear tandem axles mounted upon said frame whereby the load of the rear portion of a trailer will be more widely distributed over a roadbed by said tandem axles than by a conventional rear axle assembly and pivot means securing said trailer body to said frame between said rear axles.

19. The combination of claim 18 wherein said frame and said body each include a pair of longitudinal members, brackets secured to and depending from the body frame member, complementary bearing surfaces on said frame and body longitudinal members, said pivot means having lost motion therein whereby when the load of the body rests upon said complementary bearing surfaces, the load will be removed from said pivot means.

20. The combination of claim 19 wherein said bearing surfaces comprise cam surfaces eccentric to the axis of said pivot means.

References Cited in the file of this patent

UNITED STATES PATENTS

| | | |
|---|---|---|
| 1,659,245 | Delker | Feb. 14, 1928 |
| 1,840,435 | Davis | Jan. 12, 1932 |
| 2,094,836 | Clark | Oct. 5, 1937 |
| 2,661,236 | Schonrock | Dec. 1, 1953 |